Dec. 16, 1969 A. F. PODELL 3,484,724

TRANSMISSION LINE QUADRATURE COUPLER

Filed Aug. 16, 1968

*INVENTOR*
ALLEN F. PODELL

*BY*
Kenway, Jenney & Hildreth
ATTORNEYS

United States Patent Office 3,484,724

Patented Dec. 16, 1969

3,484,724

TRANSMISSION LINE QUADRATURE COUPLER

Allen F. Podell, Cambridge, Mass., assignor to Adams-Russell Co., Inc., Waltham, Mass., a corporation of Massachusetts Filed Aug. 16, 1968, Ser. No. 753,113

Int. Cl. H01p *5/14*

U.S. Cl. 333—10 4 Claims

ABSTRACT OF THE DISCLOSURE

A quadrature coupler formed of two pairs of transmission lines and selected lumped capacitances; the transmission lines being wound in bifilar fashion such that; signals in one mode undergo a phase shift characteristic of a lattice network and signals in the other mode undergo a phase shift characteristic of a T network. The sum of the signals in the two modes appears at one output port and the difference appears at the other port, these signals then being 90° out of phase over at least one octave.

FIELD OF THE INVENTION

This invention relates in general to a hybrid coupling network operating in the radio frequency region and more particularly to a quadrature hybrid coupler employing transmission lines and operating over a relatively wide frequency range.

BACKGROUND OF THE INVENTION

Quadrature hybrid couplers are circuits which generally include two pairs of ports, which are interconnected such that, when the impedances across each port of a pair are matched, a signal applied to one port is isolated from the other port of that pair but divides between the other two ports producing output signals which are 90° out of phase from one another. In the past, some quadrature couplers have been formed using a lattice network or other known phase shifting network so that the signal transmitted to one of the output ports will be phase shifted 90° from that transmitted to the other. One limitation on these prior art couplers is the relatively narrow band of frequencies for which a 90° phase shift is produced by such circuits. Other lumped circuit designs which maintain a precise 90° phase shift over a wide band, exhibit variations in coupling coefficient which limit them generally to much less than an octave.

A design for a quadrature coupler which operates over a relatively wide bandwidth is described in my pending application Ser. No. 729,012, assigned to the assignee of the entire right, title and interest in this application. In that circuit a pair of 180° hybrid couplers are interconnected through two phase shift networks, the phase shift introduced by one network remaining approximately 90° out of phase with the phase shift introduced by the other over a relatively wide bandwidth. The output signals appearing then at the sum and difference ports of the second 180° hybrid coupler remain precisely 90° out of phase over a wide bandwidth.

SUMMARY OF THE INVENTION

Broadly speaking, the quadrature coupler of the present invention employs a pair of identical transmission lines interconnected through a second pair of transmission lines, having a different characteristic impedance than the first pair, but identical with each other. Capacitors of carefully selected value are connected across the transmission lines of the second pair and additional capacitors are connected between these lines and ground. The combination of these capacitors and the inductances of the second pair of transmission lines appear as a lattice network to a signal applied as a push-pull signal across the first pair of transmission lines. Thus, a push-pull signal applied across one of the first pair of transmission lines undergoes the phase shift characteristic of this lattice network in being transmitted to the other of the first pair of transmission lines. This arrangement of the second pair of transmission lines and the capacitors, however, is such that for a signal applied in the push-push mode to the first pair of transmission lines only a T filter section appears and the push-push signal undergoes a phase shift characteristic of the T section in being transmitted from one end of the first pair of transmission lines to the other end of the other.

If both modes are simultaneously applied (as when a single input signal is applied), then when these two modes reach the end of the transmission line, or are propagated into another identical transmission line, the signal appearing at one side of the conductor on that transmission line will be the sum of the push-push mode signal and the push-pull mode signal, while the signal appearing on the other conductor of that transmission line will be the difference between these two signals. A signal applied between one conductor and ground may be considered as two simultaneous one-half amplitude signals, one in the push-push mode, the other in the push-pull mode. Where, as, in the present invention, the two identical transmission lines are interconnected as above described, the resulting signal appearing at one conductor of the second one of the first pair of transmission lines will be the sum of two signals having a phase difference characteristic of the difference in phase shift between the lattice network and the T network and the signal appearing on the other conductor of that transmission line will be the sum of two signals undergoing these same phase shifts. If the difference in these phase shifts is made approximately 90° over a relatively wide bandwidth, for example, an octave, then the signals appearing on these two conductors will be precisely 90° out of phase.

DESCRIPTION OF PREFERRED EMBODIMENTS

Figure 1:
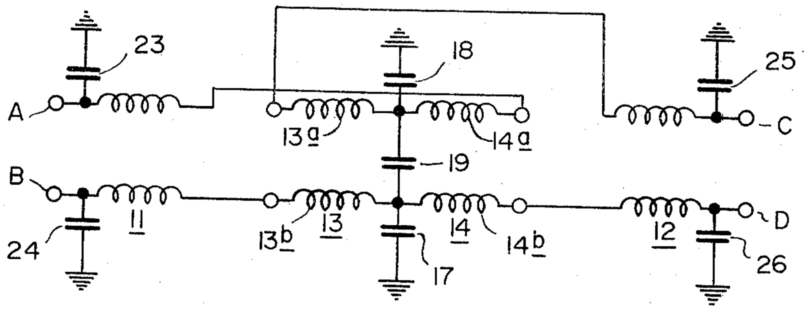
FIG. 1 is an illustration in schematic form of a quadrature coupler formed in accordance with the principles of this invention.

In the circuit of FIG. 1, a section of transmission line 11 is connected through transmission lines 13 and 14 to a fourth transmission line 12. Transmission lines 11 and 12 are identical, typically being 100 ohm line. Transmission lines 13 and 14 are identical to one another but generally of substantially lower characteristic impedance than transmission line 11, for example, where line 11 is a 100 ohm line, lines 13 and 14 may be 25 ohm or lower impedance lines. Transmission lines 11 and 12 are wound bifilar on the same core, which typically may be a plastic rod such as cross linked polystyrene. These transmission lines are, however, wound in opposite directions.

Similarly, transmission lines 13 and 14 are wound bifilar on one core, which may be formed of the same material. A capacitor 19 is connected from the junction between one conductor 13*a* of transmission line 13 and the conductor 14*a* of transmission line 14 to the junction between the other conductors 13*b* and 14*b* of the same pair of transmission lines. Capacitor 18 is connected from the midpoint between conductors 13*a* and 14*a* to ground and, similarly, capacitor 17 is connected from the mid-point between conductors 13*b* and 14*b* to ground. The terminal ends of transmission line 11 are designated A and B, while the terminal ends of transmission line 12 are designated C and D. For the hybrid coupler of the invention, terminal A and ground form one port and terminal B and ground form the other port of the same pair. The third port is formed by terminal C and ground, and the other port of that pair is formed between terminal D and ground. Capacitors 23, 24, 25 and 26 are connected from terminals A, B, C and D respectively to ground and serve the purpose of compensating for stray inductance in the connections.

As previously mentioned, the purpose of this quadrature coupler circuit is to couple power such that a signal applied to port A is isolated from port B and appears as a pair of signals at ports C and D with these latter signals being precisely 90° out of phase. The division of power between output terminals C and D will depend, as will be described below, upon the precise choice of circuit parameters. This operation of the circuit requires that each of the ports be terminated in appropriate matching impedance; for 100 ohm lines the ports would require 50 ohm matching impedances.

The manner in which the circuit produces division of a signal applied, for example, to input port A, to achieve 90° out of phase signals on ports C and D may be more clearly explained with reference to FIGS. 2 and 3. A signal applied between terminal A and ground may be considered as a pair of one half amplitude signals applied to the transmission line, one signal being applied in the push-push mode, while the other is applied in the push-pull mode. That portion of the circuit which includes transmission lines 13 and 14 will appear as a different effective filter circuit to signals in the push-push mode and signals in the push-pull mode.

Figure 2A:
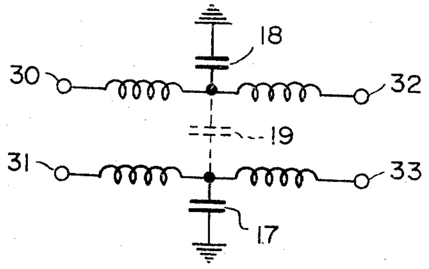
FIG. 2*a* is an illustration in schematic form of a portion of the circuit of FIG. 1 as it effects one mode of propagation.

In FIG. 2*a* this portion of the circuit is illustrated with capacitor 19 shown in phantom, since this capacitor has no effect for signals in the push-push mode. In this mode there will be no potential difference between the junction between conductors 13*a* and 14*a* and the junction between conductors 13*b* and 14*b*, hence there is no charging or discharging of the capacitor and, in effect, it disappears from the circuit. In this mode, then, the transmission lines 13 and 14 appear as relatively small leakage inductances, each with a capacitor from the center of the inductors to ground. The equivalent circuit for this situation is then illustrated in FIG. 2*b* with the inductors $L_1$ representing the leakage inductance of lines 13 and 14 and the capacitor $C_1$ representing the parallel combination of capacitors 17 and 18. This equivalent circuit is a T filter section and provided lines 11 and 12 are wound closely enough, the cutoff frequency will be well above the band of interest, if 11 and 12 are not so coupled their leakage inductances will limit the frequency cutoff. Similarly if the impedances of 13 and 14 are too high the resultant leakage inductance will result in the same problem. While this close coupling provides optimum results, the coupler will operate, but with frequency limitations without this close coupling. The phase shift introduced by this section varies with frequency, so that push-push mode signal transmitter from the transmission line 11 to the transmission line 12 undergoes a phase shift, the value of which is determined by both the frequency of the signal and the values of $L_1$ and $C_1$.

Figure 3A:
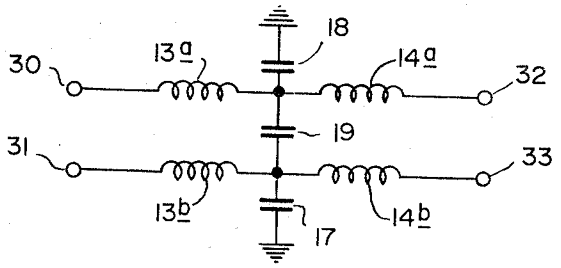
FIG. 3*a* is a schematic illustration of a portion of the circuit of FIG. 1.
Figure 3B:
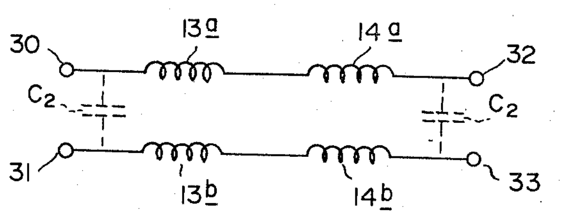
FIG. 3*b* is a schematic representation of an approximate equivalent circuit representation of the circuit of FIG. 3*a*.

In FIG. 3*a*, the portion of the circuit including transmission lines 13 and 14 is again shown, however, all three of the capacitors 17, 18 and 19 are effective in the push-pull mode since a difference in potential may exist between the junction between conductors 13*a* and 14*a* and the junction between conductors 13*b* and 14*b*. In FIG. 3*b* a circuit is illustrated which is approximately the equivalent of the portion of the circuit illustrated in FIG. 3*a*. In the equivalent circuit of FIG. 3*b* capacitors $C_2$ are shown in phantom as being coupled directly between terminals 30 and 31 and terminals 32 and 33, and the capacitors 17, 18 and 19 are not shown. The capacitors 17, 18 and 19 may be considered, for the push-pull mode, as a single equivalent capacitor connected where capacitor 19 is in the circuit of FIG. 3*a*. This equivalent capacitor would have a value equal to the value of the combination of capacitor 19 in parallel with the series combination of capacitors 17 and 18. Since the transmission lines are bifilar wound this capacitance may be considered as acting approximately the same as two capacitors of half that value coupled between the terminals 30 and 31 and 32 and 33.

Figure 2B:
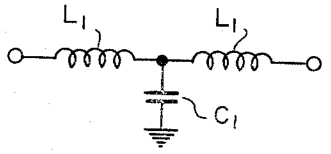
FIG. 2*b* is a schematic illustration of the equivalent circuit of FIG. 2*a*.
Figure 3C:
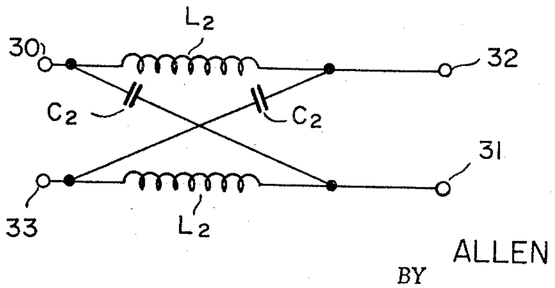
FIG. 3*c* is an equivalent circuit representation of the circuit of 3*a* as it effects a signal propagated along that circuit in the push-pull mode.

In the circuit of FIG. 3*b*, the currents through the inductors are flowing in the same direction for signals in the push-pull mode. Hence a transmission line can be used to form this network. Inductors 13*a* and 14*a* may be considered as a center tapped conductor and accordingly they are mutually coupled. Similarly inductors 13*b* and 14*b* are mutually coupled. Thus for a push-pull signal transmitted from transmission line 11 toward transmission line 12, the circuit of FIG. 3*b* appears as the equivalent circuit illustrated in FIG. 3*c* wherein the inductors $L_2$ are twice the value of each of the inductances of each of the conductors 13*a*, 13*b*, 14*a* and 14*b*, and wherein the current flowing from terminal 30 to terminal 32 is opposite in direction to that flowing from terminal 33 to terminal 31. The equivalent circuit shown in FIG. 3*c* is a lattice network having one pole, which introduces a phase shift to the push-pull signal, with the amount of phase shift being dependent upon the frequency of the signal and the value of the inductors and capacitors. These values can be arranged such that the difference in phase shift of the push-pull signal produced by this lattice network and the phase shift in the push-push signal produced by the T network of FIG. 2*b* is approximately 90°.

The outputs are then being supplied with two out of phase signals, one in the push-push mode and the other in the push-pull mode. At terminal C the signal which appears is the difference between these two modes, while the signal appearing between terminal D and ground is the sum of these two mode signals. It can be shown that for two out of phase signals of equal magnitude, the phase angle between the sum of these two signals and the difference of these two signals is precisely 90°. The magnitude of the two resultant signals will vary with variations in the phase difference between the two initial signals. Since, in considering a signal applied between input terminal A and ground as a pair of signals in two different modes, it is inherent that the pair of signals be of the same magnitude, then the phase separation between the sum of these differing mode signals and the difference between these differing mode signals after undergoing the phase shifts introduced by the intermediate transmission sections, will be precisely 90°.

In a specific example, if the transmission lines 11 and 12 are 100 ohm lines wound three times each on ⅛" diameter cross-linked polystyrene rod and transmission lines 13 and 14 are 25 ohm lines wound ten turns on a similar rod, and if capacitor 19 is made approximately 82 pf. and each of the capacitors 17 and 18 are about 43 pf. then the circuit of FIG. 1 will operate as a quadrature coupler over a frequency range from 20 to 40 mHz.

The circuit illustrated may be connected to another duplicate circuit in order to extend the frequency range of the coupler.

While the circuit has been described in terms of pairs of transmission lines 13 and 14, it should be understood that a single transmission line with capacitors connected to the center of each conductor would be the full equivalent.

The invention having been described various modifications and improvements will now occur to those skilled in the art.

What is claimed is:

1. A quadrature coupler operative over a predetermined band of frequency comprising, first and second transmission lines having a characteristic impedance and first and second conductors, each of said transmission lines being substantially identical to one another;

third and fourth series connected transmission lines substantially identical to each other and each having a characteristic impedance and first and second conductors, the connection between the first conductors forming a first junction and the connection between the second conductors forming a second junction, the other end of said third transmission line first conductor being connected to one end of said first transmission line first conductor and the other end of said fourth transmission line first conductor being connected to one end of said second transmission line first conductor, the other end of said third transmission line second conductor being connected to one end of said second transmission line second conductor and the other end of said fourth transmission line second conductor being connected to one end of said first transmission line second conductor;

a first capacitor connected between said first and second junctions;

a second capacitor connected between said first junction and a point of potential reference;

a third capacitor connected between said second junction and said point of potential reference;

the unconnected end of said first transmission line first conductor and the point of potential reference serving as one of a first pair of ports of said coupler, the other of said first pair of ports being formed by the unconnected end of the second conductor of said first transmission line and said point of potential reference;

the unconnected end of said second transmission line first conductor and said point of potential reference forming a third port of said coupler and the fourth port of said coupler being formed by the unconnected end of said second transmission line second conductor and point of potential reference, said first and second transmission lines being wound bifilar, said third and fourth transmission lines being wound bifilar, the characteristic impedances of said third and fourth transmission lines and the values of said capacitors being selected such that a signal applied in the push-pull mode along said first transmission line through said third and fourth transmission lines undergoes a phase shift which differs by a substantially constant amount over said band of frequency from the phase shift introduced by the same components for a signal in the push-push mode transmitted along these transmission lines, whereby, in response to a signal applied to one of said first pair of ports, signals are produced at said third and fourth ports with a phase difference of precisely 90°.

2. A quadrature coupler in accordance with claim 1 wherein said displacement between phase shifts for said differing mode signals is substantially 90°.

3. A quadrature coupler in accordance with claim 1 wherein said first and second transmission lines have a characteristic impedance of substantially 100 ohms and said third and fourth transmission lines have a characteristic impedance of no more than 25 ohms.

4. A quadrature coupler in accordance with claim 3 wherein said first capacitor has a value of approximately 80 pf. and each of said second and third capacitors has a value of approximately 40 pf. and said band of frequency has a mean frequency of 30 mHz.

References Cited

UNITED STATES PATENTS 2,883,647 4/1959 Leeds et al.

HERMAN KARL SAALBACH, Primary Examiner

PAUL L. GENSLER, Assistant Examiner

U.S. Cl. X.R.

333—11